United States Patent [19]

Russell

[11] 4,215,507
[45] Aug. 5, 1980

[54] ADJUSTABLE FISHING LURE BILL

[76] Inventor: Harry J. Russell, 3009 School St., Rockford, Ill. 61103

[21] Appl. No.: 926,531

[22] Filed: Jul. 20, 1978

[51] Int. Cl.³ .............................................. A01K 85/00
[52] U.S. Cl. .................................... 43/42.22; 43/42.47
[58] Field of Search ................... 43/42.22, 42.47, 42.23

[56] References Cited

U.S. PATENT DOCUMENTS

| 1,266,311 | 5/1918 | Phinney | 43/42.22 |
| 1,927,441 | 9/1933 | Korte | 43/42.47 |
| 2,494,384 | 1/1950 | Gadzinski | 43/42.22 |
| 2,945,318 | 7/1960 | Lassiter | 43/42.47 |
| 3,023,537 | 3/1962 | Madson | 43/42.22 |
| 3,727,339 | 4/1973 | LeMaster | 43/42.22 |

FOREIGN PATENT DOCUMENTS 67717  4/1944  Norway ................... 43/42.47

Primary Examiner—Nicholas P. Godici

[57] ABSTRACT

A fishing lure of the floating and diving type having an adjustable fishing lure bill with three painted depth line marks to properly fish the fish lure body at shallow, medium and deep depths. The fish lure body provides a locking mechanism for the purpose of securing and adjustment of the adjustable fishing lure bill on the fish lure body.

2 Claims, 5 Drawing Figures

ADJUSTABLE FISHING LURE BILL

This invention relates to fishing lures of the floating and diving types and the object of this invention is to provide the fish lure body with an adjustable fish lure bill. Yet another purpose of this invention, when retrieved the adjustable fishing lure bill will cause the fish lure body to dive adjustably to the preselected depths, which are shallow, medium and deep.

Another object of this invention is to provide a fish lure body the means of fishing three depths with one adjustable fishing lure bill. Yet another object of this invention, is therefore, to provide an improved fishing lure bill which has three painted depth line marks which may be easily adjusted to provide a shallow, medium, or deep running fish lure.

This invention also embodies a fish lure body with a flat grooved-out section to form and provide a mounting place for the adjustable fishing lure bill on the top, front end of the fish lure body. Still another object of this invention is a locking mechanism which is provided to hold the adjustable fishing lure bill on to the fish lure body. The invention, also, includes a slot gauge in the adjustable fishing lure bill to provide means of depth adjustment for the fishing lure body.

DESCRIPTION OF THE PREFERRED EMBODIMENTS

Figure 1:
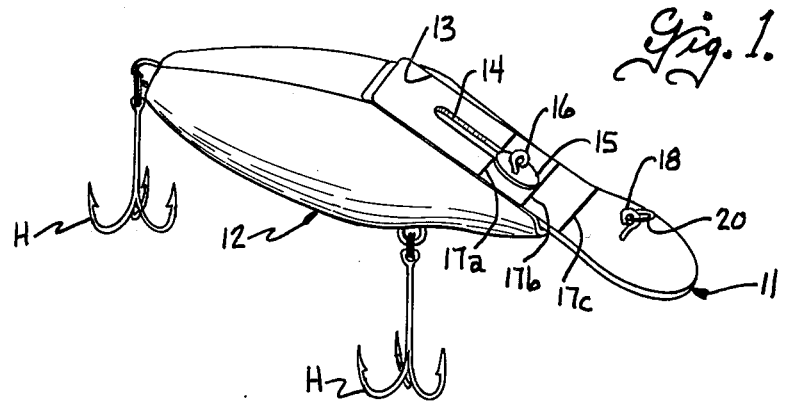
FIG. 1 is a three quarter top plan view.
Figure 2:
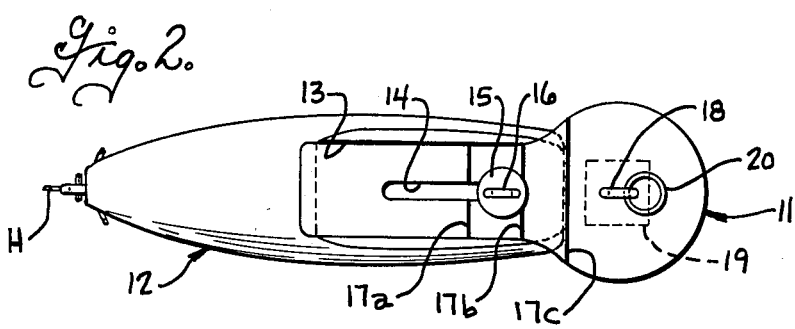
FIG. 2 is a top plan view.
Figure 3:
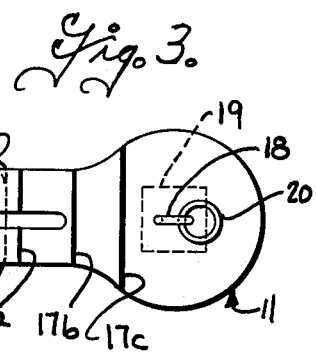
FIG. 3 is a top plan view showing the Adjustable Fishing Lure Bill in the deep depth selection.
Figure 4:
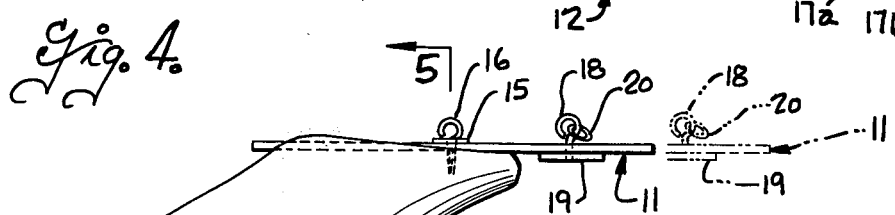
FIG. 4 is a side view of the Adjustable Fishing Lure Bill in its shortened position and maximum extension shown in phantom.
Figure 4:
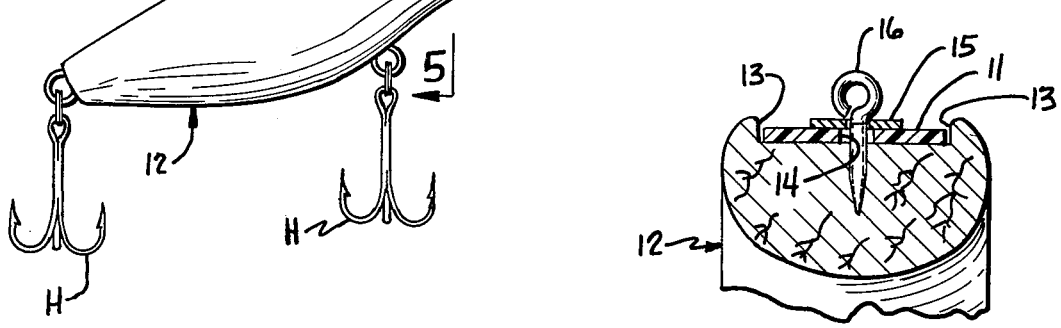
Figure 5:
FIG. 5 is a transverse sectional view through the lure body and locking mechanism taken on the plane 5—5 of FIG. 4 showing the Adjustable Fishing Lure Bill in its locked position.

Referring now to the drawings by reference characters, the Adjustable Fishing Lure Bill 11 is flat mounted on the top front end of a fishing lure body 12. Two sets of treble hooks "H" are mounted on the fishing lure body 12.

The grooved out side walls 13 of the base holds the Adjustable Fishing Lure 11 in place. The slot gauge 14 in the Adjustable Fishing Lure Bill 11 is provided so that the Adjustable Fishing Lure Bill 11 can be slid back and forth.

The mode of holding the Adjustable Fishing Lure Bill 11 onto the Fishing Lure Body 12 is provided when a washer 15 is placed over the slot gauge 14 in the Adjustable Fishing Lure Bill 11. The eye screw 16 and the washer 15 on the Adjustable Fishing Lure Bill 11 is very important as they form the locking mechanism on the Adjustable Fishing Lure Bill 11.

There are three depth line marks on the Adjustable Fishing Lure Bill 11 to fish deep 17a, medium 17b, and shallow 17c.

The operation to adjust the Adjustable Fishing Lure Bill 11 is to loosen the eye screw 16 just enough so that the Adjustable Fishing Lure Bill 11 can slide to the proper depth selection then tighten up the eye screw 16 to hold the Adjustable Fishing Lure Bill 11 in a desired position.

An eye screw 18 is mounted on the top front of the Adjustable Fishing Lure Bill 11 through a base support 19 underneath the front part of the Adjustable Fishing Lure Bill 11.

The base support 19 is important as it adds strength for the eye screw 18 mount.

A split ring 20 is added to the eye screw 18 which is mounted on the top front of the Adjustable Fishing Lure Bill 11 for the purpose of attaching fishing line to the Adjustable Fish-Lure Bill 11.

What is claimed is:

1. A fishing lure of the floating and diving type comprising; a lure body, an adjustable fishing lure bill, a grooved out flat surface on the uppermost front end surface of the lure body, said grooved out flat surface being of the same thickness, width, and length as an upper rectangular shaped portion of the lure bill providing means for adjustably mounting said adjustable fishing lure bill, said grooved out flat surface being bounded by a pair of perpendicular side walls for laterally guiding the longitudinally traveling adjustable fishing lure bill, said upper rectangular shaped portion having a slot for receiving a means for locking the adjustable fishing lure bill in a selected adjusted position, the lure bill further having a lower rounded end portion and an eye screw mounted in the central portion of said lower rounded end portion, said eye screw having a split ring attached thereto for attachment of the lure to a fishing line.

2. The fishing lure of claim 1, wherein the upper rectangular portion of the lure bill has depth line marks thereon defining a means for selection of a predetermined position of adjustment of said adjustable fishing lure bill enabling the lure to be used at various fishing depths.

* * * * *